United States Patent
Park

(10) Patent No.: US 7,366,131 B2
(45) Date of Patent: Apr. 29, 2008

(54) POWER SAVING METHOD IN A MOBILE COMMUNICATION TERMINAL

(75) Inventor: Young Jae Park, Gyeonggi-do (KR)

(73) Assignee: LG Electronics Inc., Seoul (KR)

( * ) Notice: Subject to any disclaimer, the term of this patent is extended or adjusted under 35 U.S.C. 154(b) by 236 days.

(21) Appl. No.: 11/198,789

(22) Filed: Aug. 5, 2005

(65) Prior Publication Data
US 2006/0030373 A1   Feb. 9, 2006

(30) Foreign Application Priority Data
Aug. 5, 2004   (KR) .............. 10-2004-0061613

(51) Int. Cl.
*H04Q 7/00* (2006.01)
(52) U.S. Cl. ............... 370/328; 455/574; 455/343.5
(58) Field of Classification Search ............ 370/335, 370/342, 337, 336, 347, 311, 348; 455/574, 455/458, 436, 450, 418, 561
See application file for complete search history.

(56) References Cited

U.S. PATENT DOCUMENTS

| | | |
|---|---|---|
| 6,041,241 A | 3/2000 | Willey |
| 6,628,972 B1 * | 9/2003 | Lee ................... 455/574 |
| 2004/0170141 A1 * | 9/2004 | He et al. ............. 370/335 |
| 2005/0036464 A1 * | 2/2005 | Rajkotia et al. ..... 370/336 |
| 2005/0141464 A1 * | 6/2005 | Willey et al. ........ 370/337 |
| 2005/0164705 A1 * | 7/2005 | Rajkotia et al. ..... 455/436 |
| 2005/0164718 A1 * | 7/2005 | Rajkotia et al. ..... 455/458 |
| 2005/0164741 A1 * | 7/2005 | Rajkotia et al. ..... 455/561 |
| 2005/0201311 A1 * | 9/2005 | Willey et al. ........ 370/311 |
| 2005/0239449 A1 * | 10/2005 | Timms ................ 455/418 |
| 2006/0068832 A1 * | 3/2006 | Islam et al. ......... 455/528 |

FOREIGN PATENT DOCUMENTS

KR   1020030034452 A   10/2001

* cited by examiner

*Primary Examiner*—Tan Trinh
(74) *Attorney, Agent, or Firm*—Lee Hong Degerman Kang & Schmadeka

(57) ABSTRACT

A power saving method in a mobile communication terminal is provided. The method comprises requesting a change from a first slot cycle index (SCI) used by a mobile communication terminal to a second SCI in a power saving mode; transmitting the second SCI to a base station; and receiving an acknowledgement indicating the adjustment of a slot mode of the base station into a slot mode corresponding to the second SCI.

14 Claims, 3 Drawing Sheets

POWER SAVING METHOD IN A MOBILE COMMUNICATION TERMINAL

CROSS REFERENCE TO RELATED APPLICATIONS

Pursuant to 35 U.S.C. § 119(a), this application claims the benefit of earlier filing date and right of priority to Korean Patent Application No. 2004-061613, filed on Aug. 5, 2004, the content of which is hereby incorporated by reference herein in its entirety.

FIELD OF THE INVENTION

The present invention relates to a mobile communication terminal and, more particularly, to a power saving method in a mobile communication terminal.

BACKGROUND OF THE INVENTION

Mobile communication terminals use rechargeable batteries that only last for a predetermined duration. However, mobile communication terminals are used on a daily basis during all hours of the day and thus will run out of battery unless the battery is regularly charged. Thus, it is desirable to control battery power consumption in a mobile communication terminal.

Battery consumption can be minimized by maximizing the standby time of the mobile communication terminal. By setting an index value according to a time zone in a slot cycle (i.e., a slot mode of the mobile communication terminal), the slot cycle is changed by adjusting a slot cycle index (SCI) value in the mobile communication terminal. To adjust a power-saving mode of the mobile communication terminal, a base station for the mobile communication terminal does not adjust its slot cycle.

So, the slot cycle of the mobile communication terminal becomes greater than that of the base station. Hence, a paging message sent from the base station may not be received by the mobile communication terminal.

In particular, when an SCI value between a mobile communication terminal and a base station is set to '2', monitoring time between the mobile communication terminal and the base station is performed each slot cycle of 5.12 seconds. Accordingly:

'Slot cycle length=$1.28*2^i$, where 'i' is a slot cycle index' (Equation 1)

According to Equation 1, if the SCI value set in the mobile communication terminal is adjusted by '3' to enter the power-saving mode of the mobile communication terminal, the adjusted slot cycle of the mobile communication terminal becomes 10.24 seconds.

Yet, since the base station keeps the initial SCI value of '2' without adjusting to SCI of the mobile communication terminal, the base station will perform the monitoring with the slot cycle of 5.12 seconds.

Accordingly, the mobile communication terminal, as shown in FIG. 1, wakes up from the power-saving mode at slot cycles t0, t2 or t4, while the base station monitors slot cycles of t0, t1, t2, t3 or t4. Thus, the mobile communication terminal and the base station differ from each other in slot cycle.

Paging messages sent from the mobile communication terminal to the base station can be monitored by the base station without loss. However, in case of paging messages sent from the base station, since the slot cycle of the mobile communication terminal is elongated, the paging message sent for the slot cycle t1 or t3 is lost because the mobile communication terminal is in standby mode in those cycles.

A system or method is needed to overcome the above problem.

SUMMARY OF THE INVENTION

Features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, a power saving method for a mobile communication terminal is provided.

The method comprises receiving a slot mode adjustment request for a first slot cycle index (SCI) to replace a second SCI used for communication between a base station and a mobile communication terminal; processing the request to determine whether the first SCI is supported by the base station; and acknowledging the request, when the first SCI is supported by the base station.

The method further comprises applying the first SCI to the mobile communication terminal. The request is transmitted from the mobile communication terminal to the base station via a registration message. A first slot cycle duration according to the first SCI is longer than a second slot cycle associated with the second SCI.

In accordance with another embodiment, a power saving method in a mobile communication terminal is provided. The method comprises requesting a change from a first slot cycle index (SCI) used by a mobile communication terminal to a second SCI in a power saving mode; transmitting the second SCI to a base station; and receiving an acknowledgement indicating the adjustment of a slot mode of the base station into a slot mode corresponding to the second SCI.

Communication between the mobile communication terminal and the base station based on the second SCI is monitored. In one embodiment, the first SCI is smaller than the second SCI. A setup menu of the mobile communication terminal may be used to perform the requesting step. Alternatively, a key on a keypad of the mobile communication terminal may be used to perform the requesting step.

In accordance with yet another embodiment, a mobile communication terminal comprises means for submitting a request to a base station for switching from a first slot cycle index (SCI) to a second SCI such that the second SCI provides for the mobile communication terminal to wake-up less frequently; and means for receiving an acknowledgement from the base station indicating that the base station supports a change from the first SCI to the second SCI, wherein the base station switches communicating over the second SCI instead of the first SCI.

The mobile communication terminal further comprises means for switching from the first SCI to the second SCI upon receiving the acknowledgement from the base station, such that a second slot cycle associated with the second SCI is longer than a first slot cycle associated with a first SCI.

In yet another embodiment, a power saving system for a base station in a mobile communication network comprises means for receiving a slot mode adjustment request for a first slot cycle index (SCI) to replace a second SCI used for communication between a base station and a mobile communication terminal; means for processing the request to determine whether the first SCI is supported by the base station; and means for acknowledging the request, when the first SCI is supported by the base station.

In one embodiment, the system further comprise means for applying the first SCI to the mobile communication terminal. The request is transmitted from the mobile communication terminal to the base station via a registration message. Depending on implementation, the registration message is at least one of a Timer-based Registration, Power-up Registration, Zone-based Registration, Power-down Registration, Parameter-change Registration, Ordered Registration, Distance-based Registration, and User Zone-based Registration.

These and other embodiments of the present invention will also become readily apparent to those skilled in the art from the following detailed description of the embodiments having reference to the attached figures, the invention not being limited to any particular embodiments disclosed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

Features, elements, and aspects of the invention that are referenced by the same numerals in different figures represent the same, equivalent, or similar features, elements, or aspects in accordance with one or more embodiments of the system.

DETAILED DESCRIPTION OF THE PREFERRED EMBODIMENTS

Figure 2:
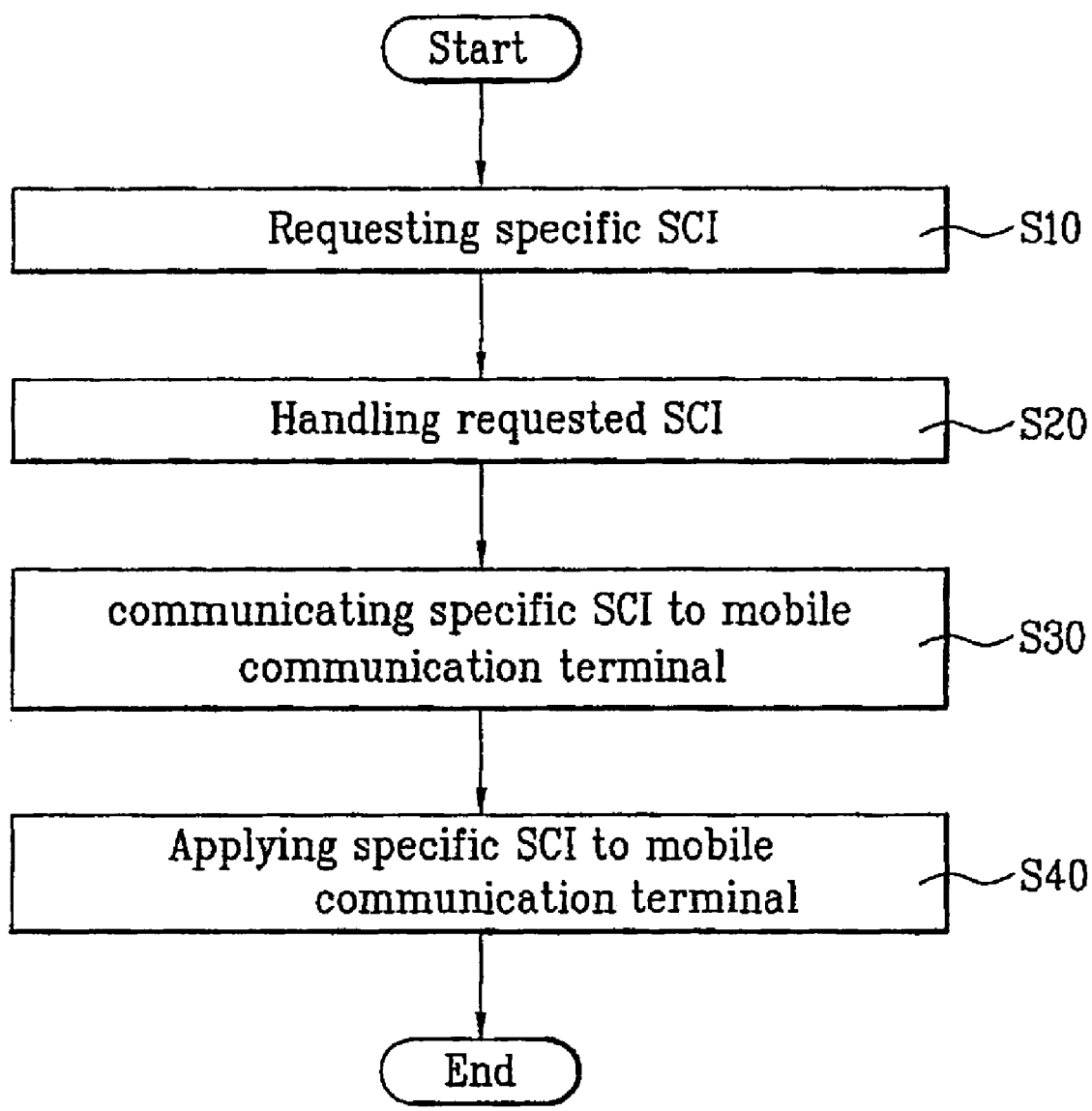
FIG. 2 is a flowchart of a power-saving method in a mobile communication terminal according to one embodiment of the present invention.

Referring to FIG. 2, a power-saving method in a mobile communication terminal according to a preferred embodiment of the present invention is provided. When a user of a mobile communication terminal decides that it is an emergency situation, the user requests to use a specific slot cycle index (SCI) to communicate with the base station.

As such, the base station receives a specific SCI request to communicate with the mobile communication terminal (S10). In a preferred embodiment, the mobile communication terminal requests to use a SCI different from that being currently used.

In one embodiment, the mobile communication terminal comprises a specific button on the keypad or other part of the mobile communication terminal assigned for an emergency situation. Alternatively, the mobile communication terminal may be configured to provide a graphic user interface menu for this purpose.

By pressing the specific button or by selecting the specific menu option, a user can request the use of the specific SCI to communicate with the base station. The request may be submitted via a registration message, for example.

In a preferred embodiment, there are various registration types for configuring the registration message. For example, eight registration types may be defined as follows, in accordance with an exemplary embodiment of the invention:
(1) Timer-based Registration
(2) Power-up Registration
(3) Zone-based Registration
(4) Power-down Registration
(5) Parameter-change Registration
(6) Ordered Registration
(7) Distance-based Registration
(8) User Zone-based Registration After a SCI field is set to a specific SCI value, the mobile communication terminal sends a registration message to the base station together with one or more of the eight registration types. The base station receives the specific SCI requested from the mobile communication terminal and then handles or processes the requested SCI (S20).

The base station is configured for allowing a specific mobile communication terminal to use a specific SCI. Base station can allow or reject the specific SCI request, in a certain embodiment. In another embodiment, a base station that is not provided with the Preferably, a base station that does not provide the SCI function (e.g., applying a new SCI to a specific mobile communication terminal) rejects the request by sending a reject order for the corresponding message. A base station that supports a specific SCI function approves the corresponding request by sending an acknowledgement to the corresponding mobile communication terminal and communicating the specific SCI (S30).

If the acknowledgement order is received from the base station to the user's mobile communication terminal, the new SCI is applied to the requesting mobile communication terminal (S40).

In one embodiment, if a SCI value set in a mobile communication terminal is greater than that set in a base station, then the SCI of the based station (e.g., conventional IS2000 specification) will be the operative SCI. If the SCI value of the mobile communication terminal is set greater than that of the base station due to a user's emergency situation, the mobile communication terminal and the base station operate to monitor the slot cycle value of the mobile communication terminal.

If the mobile communication terminal requests a specific SCI from the base station, and if the base station supports the specific SCI for the mobile communication terminal, the corresponding mobile communication terminal maintains the slot mode according to the specific SCI. In an exemplary embodiment when the base station sends a paging message to the mobile communication terminal, the base station takes the currently operating SCI into consideration to select a suitable paging slot.

For example, when a currently operating SCI is '2' and when a specific mobile communication terminal requests to use a new SCI of '3', the mobile communication terminal will operate in a slot mode according to the SCI of '3' if the base station allows the request.

In such a case, a general terminal is operative with a slot cycle (e.g., 5.12 seconds) corresponding to SCI of '2', whereas the specific mobile communication terminal granted with the permission of the base station is operative with a slot cycle (e.g., 10.24 seconds) corresponding to SCI of '3'.

Once the slot cycle is extended, the number of slots monitored by the corresponding mobile communication terminal is reduced. As a result, the standby time is lengthened to save battery power. According to one embodiment of the present invention, the slot cycle of a prescribed mobile communication terminal can be scheduled to be longer than that of another mobile communication terminal.

Figure 1:
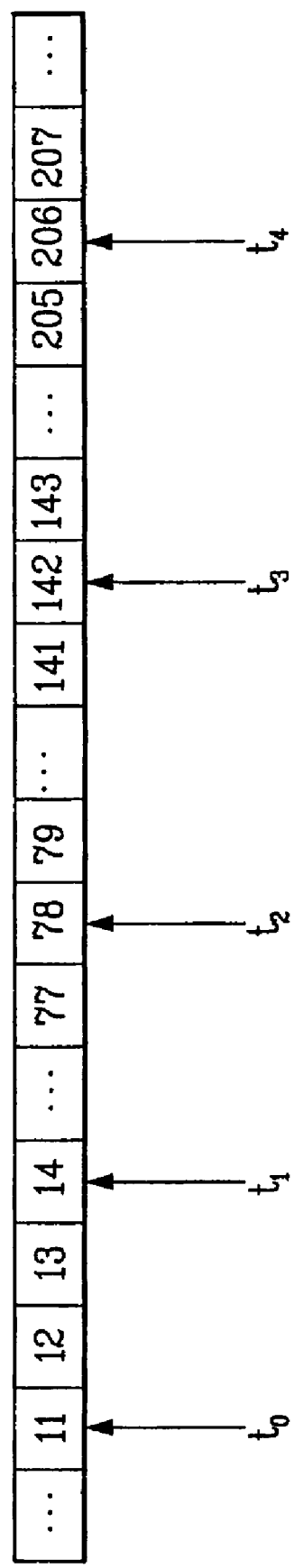
FIG. 1 is a timing diagram of a slot mode cycle in a mobile communication network according to one embodiment of the invention.

Referring back to FIG. 1, if a current time point is t0 and if a specific mobile communication terminal requests 'SCI=3', a base station transmits messages at the time points t0, t2 and t4 monitored by the corresponding mobile communication terminal.

If the base station rejects the request of the specific SCI or if the base station does not provide such a SCI function, the mobile communication terminal selects a smaller one of a terminal setup and a base station setup SCI according to Equation 1 and operates the slot mode according to the selected value. Accordingly, the power-saving method in the mobile communication terminal according to the present invention provides the following effects or advantages.

When a user selects a specific key or menu from the mobile communication terminal to notify that he is in emergency situation, the power of the mobile communication terminal is switched to the power-saving mode, to allow for longer use time for the mobile communication terminal, so that the user can make a rescue request continuously, with running out of battery quickly.

Since the user's mobile communication terminal and the base station communicate on the same slot cycle, the mobile communication terminal can receive registrations messages transmitted from the base station according to the emergency situation. During rescue operations, the present invention helps to find the user in the emergency situation quickly and precisely, thereby facilitating life rescue.

Figure 3:
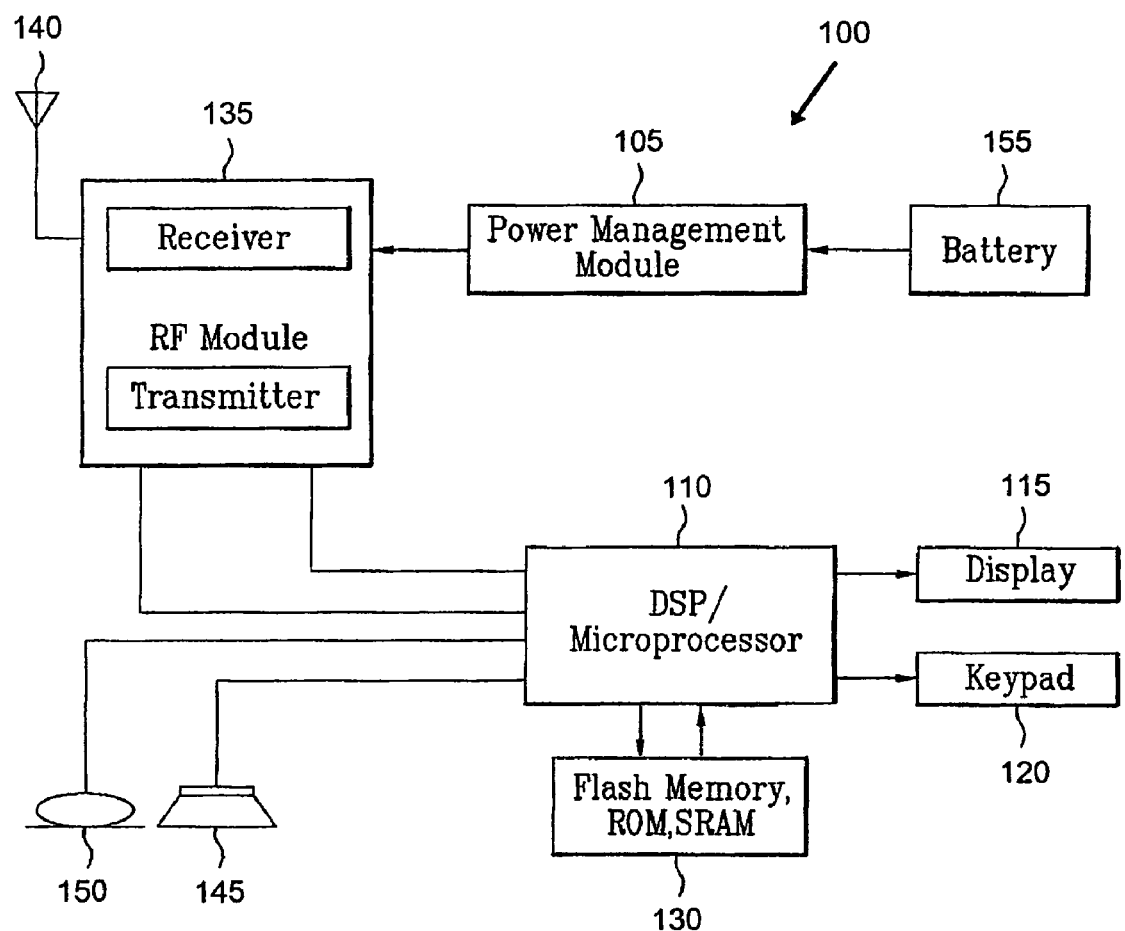
FIG. 3 is a block diagram of the components of a mobile communication terminal in accordance with one embodiment.

Referring to FIG. 3, a block diagram of a mobile communication device 100 of the present invention is illustrated, for example a mobile phone for performing the methods of the present invention. The mobile communication device 100 comprises a processing unit 110 such as a microprocessor or digital signal processor, an RF module 135, a power management module 105, an antenna 140, a battery 155, a display 115, a keypad 120, a storage unit 130 such as flash memory, ROM or SRAM, a speaker 145 and a microphone 150.

A user enters instructional information, such as a telephone number, for example, by pushing the buttons of a keypad 120 or by voice activation using the microphone 150. The processing unit 110 receives and processes the instructional information to perform the appropriate function, such as to dial the telephone number. Operational data may be retrieved from the storage unit 130 to perform the function. Furthermore, the processing unit 110 may display the instructional and operational information on the display 115 for the user's reference and convenience.

The processing unit 110 issues instructional information to the RF module 135 to initiate communication, for example, to transmit radio signals comprising voice communication data. The RF module 135 comprises a receiver and a transmitter to receive and transmit radio signals. The antenna 140 facilitates the transmission and reception of radio signals. Upon receiving radio signals, the RF module 135 may forward and convert the signals to baseband frequency for processing by the processing unit 110. The processed signals would be transformed into audible or readable information outputted via the speaker 145, for example.

The processing unit 110 is adapted to store message history data of messages received from and messages transmitted to other users in the storage unit 130, receive a conditional request for message history data input by the user, process the conditional request to read message history data corresponding to the conditional request from the storage unit, and output the message history data to the display unit 115. The storage unit 130 is adapted to store message history data of the received messages and the transmitted messages.

The embodiments described above are to be considered in all aspects as illustrative only and not restrictive in any manner. Thus, other exemplary embodiments, system architectures, platforms, and implementations that can support various aspects of the invention may be utilized without departing from the essential characteristics described herein. For example, while processors, controllers and other circuits, are described in terms of specific logical/functional circuitry relationships, one skilled in the art will appreciate that such may be implemented in a variety of ways, such as appropriately configured and programmed processors, ASICs (application specific integrated circuits), and DSPs (digital signal processors). These and various other adaptations, alternatives, modifications, variations and combinations of features of the embodiments disclosed are within the scope of the invention. The invention is defined by the claims and their full scope of equivalents.

What is claimed is:

1. A power saving method for a mobile communication terminal, the method comprising:

receiving a slot mode adjustment request from a mobile communication terminal for a first slot cycle index (SCI) to replace a second SCI used for communication between a base station and the mobile communication terminal, such that the second SCI is larger than the first SCI to save battery power of the mobile communication terminal in a first mode, wherein the first mode is activated in response to a user interaction with a user interface of the mobile communication terminal, wherein the first mode is distinct from a push-to-talk mode;

processing the slot mode adjustment request to determine whether the first SCI is supported by the base station; and acknowledging the slot mode adjustment request, when the first SCI is supported by the base station, wherein the slot mode adjustment request is transmitted from the mobile communication terminal to the base station via a registration message, and wherein the registration message comprises at least one of a timer-based registration, power-up registration, zone-based registration, power-down registration, parameter-change registration, ordered registration, distance-based registration, and user zone-based registration.

2. The method of claim 1, further comprising applying the first SCI to the mobile communication terminal.

3. The method of claim 1, wherein a first slot cycle associated with the first SCI is longer than a second slot cycle associated with the second SCI.

4. A power saving method in a mobile communication terminal, the method comprising:

requesting a change from a first slot cycle index (SCI) used by a mobile communication terminal to a second SCI in a power saving mode, such that the second SCI is larger than the first SCI to save battery power of the mobile communication terminal in a first mode, wherein the first mode is activated in response to a user interaction with a user interface of the mobile communication terminal, wherein the first mode is distinct from a push-to-talk mode;

transmitting the second SCI to a base station; and receiving an acknowledgement indicating the adjustment of a slot mode of the base station into a slot mode corresponding to the second SCI, wherein the requested change is transmitted from the mobile communication terminal to the base station via a registration message, and wherein the registration message comprises at least one of a timer-based registration, power-up registration, zone-based registration, power-down registration, parameter-change registration, ordered registration, distance-based registration, and user zone-based registration.

5. The method of claim 4, further comprising:

monitoring communication between the mobile communication terminal and the base station based on the second SCI.

6. The method of claim 5, wherein the first SCI is smaller than the second SCI.

7. The method of claim 4, wherein a setup menu of the mobile communication terminal is used to perform the requesting step.

8. The method of claim 4, wherein a key of the mobile communication terminal is used to perform the requesting step.

9. A mobile communication terminal with a power saving function, the mobile communication terminal comprising:

means for submitting a request to a base station for switching from a first slot cycle index (SCI) to a second SCI such that the second SCI provides for the mobile communication terminal to wake-up less frequently in a first mode, wherein the first mode is activated in response to a user interaction with a user interface of the mobile communication terminal, wherein the first mode is distinct from a push-to-talk mode; and means for receiving an acknowledgement from the base station indicating that the base station supports a change from the first SCI to the second SCI, wherein the base station switches communicating over the second SCI instead of the first SCI, in response to receiving the request from the mobile communication terminal, wherein the SCI switching request is transmitted from the mobile communication terminal to the base station via a registration message, and wherein the registration message comprises at least one of a timer-based registration, power-up registration, zone-based registration, power-down registration, parameter-change registration, ordered registration, distance-based registration, and user zone-based registration.

10. The mobile communication terminal of claim 9, further comprising:

means for switching from the first SCI to the second SCI upon receiving the acknowledgment from the base station.

11. The mobile communication terminal of claim 9, wherein a second slot cycle associated with the second SCI is longer than a first slot cycle associated with a first SCI.

12. A system in a base station for saving power of a mobile communication terminal in communication with the base station, the system comprising:

means for receiving a slot mode adjustment request from a mobile communication terminal for a first slot cycle index (SCI) to replace a second SCI used for communication between a base station and a mobile communication terminal, such that the second SCI is larger than the first SCI to save battery power of the mobile communication terminal in a first mode, wherein the first mode is activated in response to a user interaction with a user interface of the mobile communication terminal, wherein the first mode is distinct from a push-to-talk mode;

means for processing the slot mode adjustment request to determine whether the first SCI is supported by the base station; and means for acknowledging the slot mode adjustment request, when the first SCI is supported by the base station, wherein the SCI switching request is transmitted from the mobile communication terminal to the base station via a registration message, wherein the registration message comprises at least one of a timer-based registration, power-up registration, zone-based registration, power-down registration, parameter-change registration, ordered registration, distance-based registration, and user zone-based registration.

13. The system of claim 12, further comprising means for applying the first SCI to the mobile communication terminal.

14. The system of claim 12, wherein a first slot cycle duration associated with the first SCI is longer than a second slot cycle associated with the second SCI.

* * * * *